United States Patent
Temple et al.

(10) Patent No.: US 6,945,624 B2
(45) Date of Patent: Sep. 20, 2005

(54) DROPLET DEPOSITION APPARATUS

(75) Inventors: Stephen Temple, Cambridge (GB); Howard J. Manning, Edinburgh (GB)

(73) Assignee: Xaar Technology Limited, Cambrigde (GB)

( * ) Notice: Subject to any disclaimer, the term of this patent is extended or adjusted under 35 U.S.C. 154(b) by 249 days.

(21) Appl. No.: 10/343,300

(22) PCT Filed: Jun. 13, 2001

(86) PCT No.: PCT/GB01/02598

§ 371 (c)(1),
(2), (4) Date: Jun. 27, 2003

(87) PCT Pub. No.: WO02/15563

PCT Pub. Date: Feb. 21, 2002

(65) Prior Publication Data

US 2004/0021723 A1 Feb. 5, 2004

(30) Foreign Application Priority Data

Aug. 11, 2000 (GB) .............................. 0019849

(51) Int. Cl.⁷ ................................. B41J 2/07
(52) U.S. Cl. ........................................ 347/19; 347/5
(58) Field of Search ....................... 347/5, 19

(56) References Cited

U.S. PATENT DOCUMENTS

| 5,917,510 A | 6/1999 | Narushima et al. ............ 347/15 |
| 6,742,869 B2 * | 6/2004 | Redding et al. ............... 347/43 |
| 6,819,347 B2 * | 11/2004 | Saquib et al. ............... 347/194 |

FOREIGN PATENT DOCUMENTS

| EP | 963 844 A1 | 12/1999 |
| WO | WO 97/35421 | 9/1997 |

OTHER PUBLICATIONS

International Search Report for PCT/GB01/02598 dated Oct. 19, 2001.
International Preliminary Examination Report for PCT/GB01/02598 dated Apr. 8, 2002.

* cited by examiner

Primary Examiner—Huan Tran
(74) Attorney, Agent, or Firm—Marshall, Gerstein & Borun LLP

(57) ABSTRACT

Data input to an ink jet printer is subjected to a transformation which is the inverse of a transformation representing the errors in ink drop placement which have been measured for that specific ink jet printer.

10 Claims, 3 Drawing Sheets

DROPLET DEPOSITION APPARATUS

This is the U.S. national phase of International Application No. PCT/GB01/02598 filed Jun. 13, 2001, the entire disclosure of which is incorporated herein by reference.

This invention relates to ink jet printers and other droplet deposition apparatus.

Whilst ink jet printers offer major advantages in a wide variety of applications, the nature of the ink jet technique is such that accuracy of printing can be achieved at high speeds only with very precise control over a range of manufacturing and design factors that influence ink jet behaviour.

In the more demanding applications, a compromise is often inevitable between accuracy of printing and manufacturing yield.

It is an object of this invention to improve the accuracy of droplet deposition apparatus without compromising on manufacturing yield.

Accordingly, the present invention consists in one aspect in a droplet deposition apparatus in which selected numbers of nominally uniform droplets are deposited nominally at regularly arrayed pixels on a medium in response to input data D, comprising at least one value d for each pixel, characterised by the application to the received input data of the inverse of a transformation T which is representative of the effect measured for that specific apparatus of departures from nominal behaviour.

The invention will now be described by way of example, with reference to the accompanying drawings in which.

Figure 1:
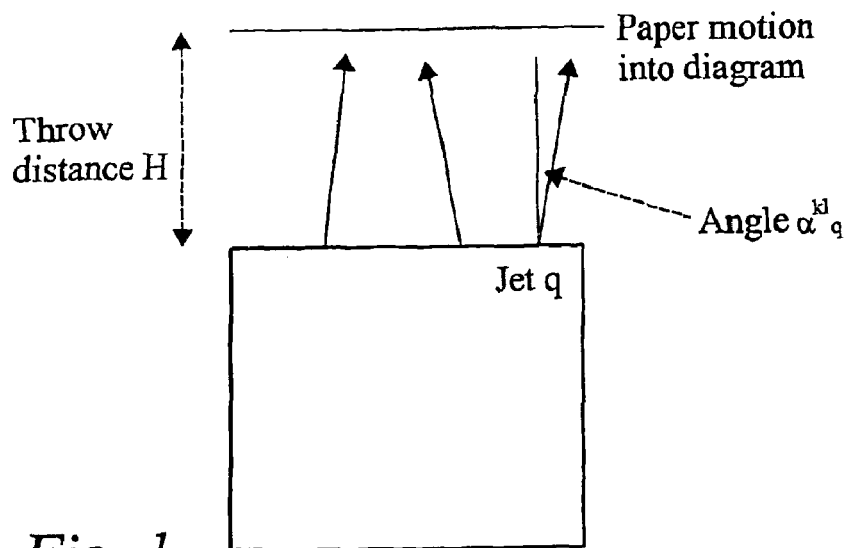
FIG. 1 is a diagram illustrating a first category of jetting error.
Figure 2:
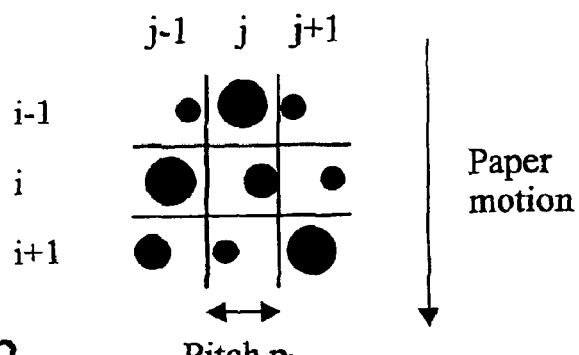
FIG. 2 is a diagram illustrating the effect of the jetting error shown in FIG. 1.

Assume that data for a colour greyscale image is available in the form of numbers $d^k_{ij}$, in the range 0 to n (typically 255), representing the amount of colour k (CMYK) required at pixel i,j. A greyscale ink jet printhead has typically only limited numbers of grey levels. Algorithms such as that disclosed in Applicant's copending PCT application no. WO97/35421 are available to produce from the $d^k_{ij}$ a reduced set of numbers $I^k_{ij}$ in the range 0 to m (typically 7 or 15), representing the number of droplets per drop (dpd) of colour k to be printed at the i,j$^{th}$ pixel. In matrix terms, L=RD where $d^k_{ij}$ are the components of D, $I^k_{ij}$, are the components of L and R is a tensor representing the transformation in the data reduction algorithm. Broadly speaking, R is a linear transformation, since $I^k_{ij}$ is given approximately by $(m+1)d^k_{ij}/n-(1/2)$; however, the I's have to be integers, so at each pixel a choice has to be made whether to round up or down, and this takes into account the nearest neighbours.

A perfect printhead, asked to fire a drop of I droplets of colour k, would produce a dot of area $s^{kl}$. Thus ideally the reduced data $I^k_{ij}$ leads to a perfectly placed round dot in the i,j$^{th}$ pixel of area $$w^k_{ij} = s^{kl} \text{ where } l = I^k_{ij}$$

Thus what is wanted can be represented by a matrix W, whose components are $w^k_{ij}$, which is related to the matrix L by W=SL. The transformation S is a diagonal matrix which imposes an approximately linear relationship between s and I at each pixel.

Following the chain of transformations, what is wanted is dot areas W=SL=SRD. The relationship between D and W is broadly linear.

In accordance with an aspect of this invention the mis-sized and mis-placed dots which are actually printed are represented by another matrix G ie they are regarded as equivalent visually to set $g^k_{ij}$ of mis-sized but perfectly placed round dots. This equivalence is discussed below; it is strictly only valid if the printing errors are modest.

What you want and what you get are related by a matrix transformation G=TW, where, in general, T is a tensor. Thus, in general, $g^k_{ij} = \Sigma\Sigma t^k_{ijef} w^e_{ef}$, where $t^k_{ijef}$ is an element of the tensor T and the summations are over the indices e and f.

An important aspect of this invention is the recognition that if T can be inverted, then the data can be adjusted to allow for the misbehaviour of the individual printhead. Thus, if the printhead is asked to print $T^{-1}W$, it will actually produce an approximation to what is wanted. Dots will still be mis-sized and misplaced, but the result will look correct to the eye.

In practice, given that the printhead does not print too badly anyway, the adjustments in $T^{-1}$ are subtle. It is therefore not possible to apply $T^{-1}$ directly to the reduced data $I^k_{ij}$, as non-integer values result, and (given the modest range 0 to m) rounding to nearest integers produces excessive errors. Therefore, $T^{-1}$ is applied to the original data: instead of $d^k_{ij}$ being fed into the data reduction process, $\Sigma\Sigma(T^{-1})^k_{ijef} d^e_{ef}$ is used instead. The numbers are high enough (0 to n) that rounding to nearest integers does not produce serious errors; and then data reduction) is applied as normal. Thus, adjusted data $T^{-1}D$ is input into the whole process, producing in turn reduced data R $T^{-1}D$, dot area wanted SR $T^{-1}D$ and dot areas actually obtained TSR $T^{-1}D$, which approximates the desired SRD.

If a printhead printed perfectly, it would produce round dots centred in their pixels. In practice, it fires mis-sized drops at the wrong velocity and in the wrong direction in two planes, producing irregular dots displaced from the correct positions in both directions. The tensor representing all the printing faults may be difficult to invert, so we will consider the possible errors in turn, and try to combine them at the end.

The simplest fault to correct is when the printhead fires incorrectly sized drops at the right velocity and in the correct direction. Then, $g^k_{ij} = b^{kl}_q w^k_{ij}$, where $b^{kl}_q$ represents the factor by which the dots of I dpd and colour k are oversized when produced by the q$^{th}$ printhead channel. There will be a simple relationship between j, representing the column in the image, k, the colour being considered, and q, the printhead channel used to print it.

This form of mis-printing is simple to correct because each pixel and colour are affected in a manner independent of all others, so the transformation T is simply a diagonal matrix B whose elements are $b^{kl}_q$. The inverse of B is another diagonal matrix whose elements are given by $(B^{-1})^{kl}_q = 1/b^{kl}_q$. Thus the adjusted data which needs to be fed into the data reduction algorithm is $d^k_{ij}/b^{kl}_q$ instead of $d^k_{ij}$. In other words, if a channel fired drops which are too large, then the columns in the image to be printed by that channel are fed with slightly reduced data.

The factors $b^{kl}_q$ have to be measured for the printhead in question. A print test is required which will be capable of determining dot sizes on acetate, using black ink; factors can be determined for each channel and each value of dpd by dividing the channel's dot diameter by the average diameter of that dpd across the printhead. It may be possible to apply the print test to other colours, but it is necessary to assume that these factors will apply to other colours and other substrates, even if the absolute dot sizes are different.

A difficulty is that the values of I are only known once data reduction has been done. Thus R needs to be applied to generate a preliminary L; then $B^{-1}$ evaluated and applied to the data D, followed by application of R to generate another L; then this should be used to adjust $B^{-1}$, and so on iteratively. If the factors $b^{kl}_q$ do not vary with I in practice, the need for this iteration is removed.

Next assume that the printhead fires drops of the correct volume, at the correct velocity, with all the jets in plane; but with the $q^{th}$ jet (which is used to print the $j^{th}$ column of the image) misdirected within the plane by angle $\alpha^{kl}_q$ to the right when firing a I dpd drop of colour k. This is illustrated in FIG. 1.

The result is that dots are misplaced across the image by distances a $\alpha^{kl}_q H$, as shown in FIG. 1.

Figure 3:
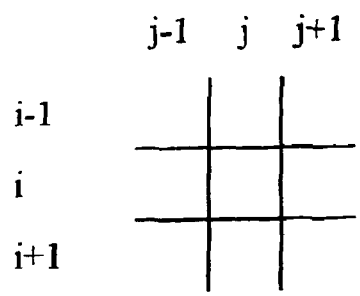
FIG. 3 is a diagram illustrating the manner in which drop deplacement errors are categorised according to an aspect of the invention.

A central assumption is that for small displacements a $\alpha^{kl}_q H \ll p_h$, the misplaced dot in the $i,j^{th}$ pixel can be considered visually equivalent to a dot properly centred in that pixel plus a small one in the neighbouring pixel. This is illustrated in FIG. 3.

For positive $\alpha^{kl}_q$, the effective dot in the $i,j^{th}$ pixel is of area $(1-\alpha^{kl}_q H/p_h)$ times the normal size, while that in the $i,j+1^{th}$ pixel is $(\alpha^{kl}_q H/p_h)$ times normal size. This can be generalised to positive or negative $\alpha^{kl}_q$, by expressing the dot in the $i,j^{th}$, pixel as $(1-|x^{kl}_q|)$, where $x^{kl}_q = \alpha^{kl}_q H/p_h$ and where $|z|$ is the magnitude of z; and recognising the existence of small effective dots in the $ij+1^{th}$ pixel of size $<x^{kl}_q>$ and in the $i,j-1^{th}$ pixel of size $<-x^{kl}_q>$. Here $<z>$ represents a function of z which equals z when $z>0$ and equals 0 when $z<0$; the result is that only one of the two subsidiary dots exists, as the dot is displaced to the left or right but not both.

If we now consider the effective dot in the $i,j^{th}$ pixel, we see that it is $$g^k_{ij} = w^k_{ij}(1-|x^{kl}_q|) \quad \text{where } | = |^k_{ij}$$
$$+ w^k_{i,j-1}\langle x^{kl}_q \rangle \quad \text{where } | = |^k_{i,j-1}$$
$$+ w^k_{i,j+1}\langle -x^{kl}_q \rangle \quad \text{where } | = |^k_{i,j+1}$$

The first term represents the area of the dot in the $i,j^{th}$ pixel, reduced to allow for its misplacement. The second term is the contribution to the effective dot in the $i,j^{th}$ pixel due to the misplacement of the dot in the $i,j-1^{th}$ pixel; and the third is the contribution from the $i,j+1^{th}$ pixel. It is possible that the latter two could both exist; the dot in the $i,j-1^{th}$ pixel could be misplaced to the right and that in the $i,j+1^{th}$ pixel to the left.

This relationship between W and G is G=WV, where V is a tridiagonal matrix:

$$g^k_{ij} = \sum w^k_{ir} v^k_{rj}, \text{ summed over } r$$

where $$v^k_{rj} = \langle x^{kl}_q \rangle \quad \text{with } | = |^k_{i,j-1} \text{ for } r = j-1$$
$$= (1-|x^{kl}_q|) \quad \text{with } | = |^k_{ij} \text{ for } r = j$$
$$= \langle -x^{kl}_q \rangle \quad \text{with } | = |^k_{i,j+1} \text{ for } r = j+1$$
$$= 0 \quad \text{for other } r$$

In order to correct this printing defect, V has to be inverted and data $\Sigma d^k_{i,r}(V^{-1})^k_{rj}$, fed into the data reduction instead of $d^k_{ij}$. Tridiagonal matrices can be inverted numerically without excessive computation time, so this is feasible. The size of the (square) matrix corresponds to the number of pixels in the image perpendicular to the direction of motion.

Note that as expected $v^k_{rj}$, is a function of r, and also of q, which depends on j. More awkwardly, $v^k_{rj}$ is also a function of I, which depends on i as well as j; this means that the inversion of V has to be carried out separately for each value of i, or for all $m^3$ combinations of $I^k_{i,j-1}$, $I^k_{i,j}$ and $I^k_{i,j+1}$, use being made of lookup tables of inverted matrices. As in the case of dot size errors, iteration over the reduced data is needed. If the angular deviations do not vary much with I, then the inversion of V has to be done only once and no iteration is needed.

The presence of the superscript k throughout indicates that the analysis also has to be carried out separately for each colour.

A print test is applied to determine jet deviations for each jet and each dot size, using black ink; it will initially be assumed that deviations are the same for other colours.

A simple example is helpful: if only one jet deviates, and it does so by the same small positive angle α for all dot sizes, and only one column of the image is printed by it, then most of V is like the unity matrix. One part of it is as follows:

| 1 | 0 | 0   | 0 | 0 | 0 |
|---|---|-----|---|---|---|
| 0 | 1 | 0   | 0 | 0 | 0 |
| 0 | 0 | 1-x | x | 0 | 0 |
| 0 | 0 | 0   | 1 | 0 | 0 |
| 0 | 0 | 0   | 0 | 1 | 0 |
| 0 | 0 | 0   | 0 | 0 | 1 | where $x = \alpha H/p_h$. The inverse is then, in part:

| 1 | 0 | 0       | 0        | 0 | 0 |
|---|---|---------|----------|---|---|
| 0 | 1 | 0       | 0        | 0 | 0 |
| 0 | 0 | 1/(1-x) | -x/(1-x) | 0 | 0 |
| 0 | 0 | 0       | 1        | 0 | 0 |
| 0 | 0 | 0       | 0        | 1 | 0 |
| 0 | 0 | 0       | 0        | 0 | 1 |

This represents the fact that the correction which must be applied to the areas of the dots in the faulty column is multiplication by 1/(1−x); that is, they must be made bigger to compensate for the fact that they will misdirect. The correction to be applied to the dots in the column to the right of the faulty one is to have added to their normal size a quantity −x/(1−x) times the size of the dots to their left; since this addition is negative, the dots are reduced in size, which compensates for the 'arrival' of some of the dot from the neighbour.

When two or more adjacent jets deviate, the nearest neighbour effects merge, and the corrections cannot be applied locally in the above manner; then the matrix must be inverted numerically.

Figure 4:
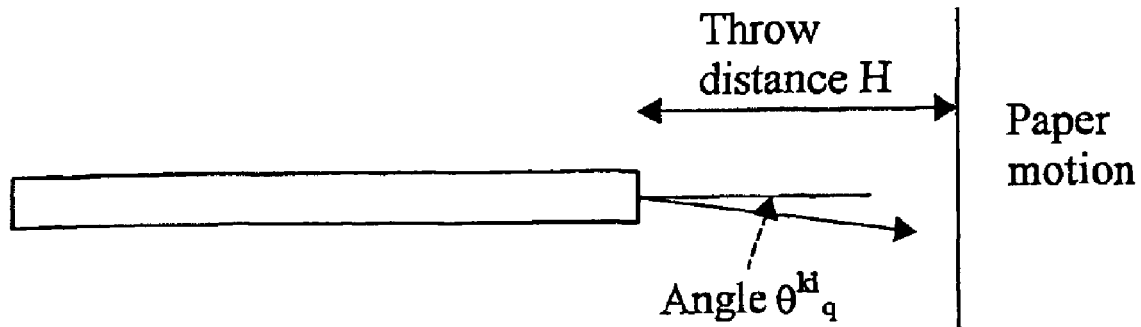
FIG. 4 is a diagram illustrating a second category of jetting error.

Referring to FIG. 4, next assume that the printhead fires drops of the correct volume, at the correct velocity, in the correct direction within the plane of the drops; but with the $q^{th}$ jet (which is used to print the $j^{th}$ column of the image) misdirected out of plane by angle $\theta^{kl}_q$ in the direction of paper motion when firing a I dpd drop of colour k.

Figure 5:
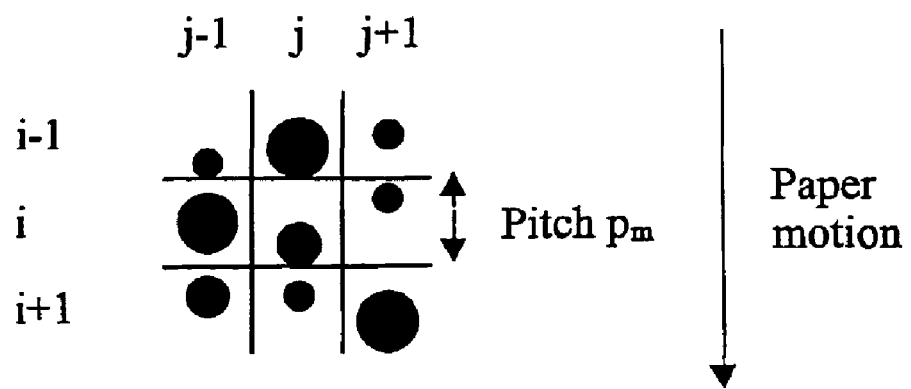
FIG. 5 is a diagram illustrating the effect of the jetting error shown in FIG. 1.

As shown in FIG. 5, the result of this error is that dots are misplaced in the direction of motion.

The displacements can be treated in a manner analogous to that used above for deviations within the plane. The effective dot in the $i,j^{th}$ pixel is:

$$g^k_{ij} = w^k_{ij}(1 - |y^{kl}_q|) \quad \text{where } | = |^k_{ij}$$

$$+ w^k_{i,j-1}\langle y^{kl}_q \rangle \quad \text{where } | = |^k_{i,j-1}$$

$$+ w^k_{i,j+1}\langle -y^{kl}_q \rangle \quad \text{where } | = |^k_{i,j+1}$$

here $y^{kl}_q = \theta^{kl}_q H/p_m$. The first term represents the area of the dot in the $i,j^{th}$ pixel, reduced to allow for its misplacement. The second term is the contribution to the effective dot in the $i,j^{th}$ pixel due to the misplacement of the dot in the $i-1,j^{th}$ pixel; and the third is the contribution from the $i+1,j^{th}$ pixel. It is possible, though unlikely, that the latter two could both exist; the dot in the pixel above could be misplaced downwards and that in the pixel below misplaced upwards, despite being fired by the same channel of the printhead, if the dpd is different in each case. More likely, the y's in all three terms are similar, since a given channel will tend to misdirect drops of all sizes to the same extent; in this case, only one of the two last terms will exist.

The transformation relationship between W and G is G=UW, where U is a tridiagonal matrix:

$$g^k_{ij} = \sum u_{ir} w_{rj},$$

$$\text{where } u_{ir} = \langle y^{kl}_q \rangle \quad \text{with } | = |^k_{i-1,j} \quad \text{for } r = i - 1$$

$$= (1 - |y^{kl}_q|) \quad \text{with } | = |^k_{ij} \quad \text{for } r = i$$

$$= \langle -y^{kl}_q \rangle \quad \text{with } | = |^k_{i+1,j} \quad \text{for } r = i + 1$$

$$= 0 \quad \text{for other } r$$

In order to correct this printing defect, U has to be inverted and the data $\Sigma(U^{-1})^k_{ir}d^k_{rj}$ fed into the data reduction algorithm instead of $d^k_{ij}$. Note that $u_{ir}$ is a function of r and of both i (through l) and j (through q and l); therefore the inversion has to be carried out separately for each value of j. This has to be done for each colour separately.

If the angular deviations of a given jet do not vary with dot size, then $y^{kl}_q$ does not vary across the matrix U, while j is being held constant. Then the matrix (now only di-diagonal) can be inverted analytically. It can be shown that then $$(U^{-1})_{ir} = 1/(1 - |y^k_q|) \quad \text{for } r = i$$

$$= (-\langle -y^k_q \rangle)^{(r-i)}/(1 - |y^k_q|)^{(r-i+1)} \quad \text{for } r > i$$

$$= (-\langle y^k_q \rangle)^{(i-r)}/(1 - |y^k_q|)^{(i-r+1)} \quad \text{for } r < i$$

where the now invariant $y^{kl}_q$ has been written simply as $y^k_q$. Here (r-i) etc are powers, not superscripts.

A simple example is instructive. Imagine that, for a given printhead channel q and colour k, the jet is firing slightly downwards, then $y^k_q$ is small and positive. Then $(U^{-1})_{ii} = 1/(1-|y^k_q|)$, $(U^{-1})_{i,i-1} \approx -y^k_q$, and other term small adjusted data for the $i,j^{th}$ pixel is $d^k_{ij}/(1-|y^k_q|) - d^k_{i-1,j}y^k_q$. The first term is an enhanced version of $d^k_{ij}$, to make up for the fact that the dot in the $i,j^{th}$ pixel is shifted downwards; and the second term is negative, which avoids the adjustment to the data from darkening the image overall.

The print test will be able to determine jet deviations for each jet and each dot size, using black ink; it will have to be assumed that deviations are the same for other colours.

The next printing fault to be analysed is velocity variation. Suppose that the jets all fire in the right direction drops of the correct size, but with velocity $s^{kl}_q v$ where v is the average velocity of all jets, and $s^{kl}_q$ is the factor by which the $q^{th}$ channel fires too rapidly a drop of I dpd and colour k. The flight time is shorter than that experienced by a drop travelling at the average velocity by $(H/v)(1-1/s^{kl}_q)$ Since the paper is travelling at speed $fp_m$ where f is the pixel frequency, the displacement of the dot in the direction of paper motion relative to its nominal position is $(fHp_m/v)(1-1/s^{kl}_q)$. This can be corrected by using the formulation given above for jet deviation out of plane, but using an effective deviation $$((\theta_{\text{eff}})^{kl}_q = \theta^{kl}_q + (fp_m/v)(1 - 1/s_{klq}).$$

Then an effective matrix $U_{\text{eff}}$ can be constructed, and inverted to produce a correction for both velocity errors and out of plane deviations.

The print test can determine jet velocities for each dot size, again using black ink to represent all colours.

The printing faults discussed above may all take place at once. If the view is taken that they act independently, they can all be corrected by replacing the data D with $U^{-1}DB^{-1}V^{-1}$, ie replacing $d^k_{ij}$, with $\Sigma\Sigma\Sigma(U_{\text{eff}}^{-1})^k_{ie}(D)_{ef}(B^{-1})^k_{fg}(V^{-1})^k_{gj}$, summed over e, f and g.

Figure 6:
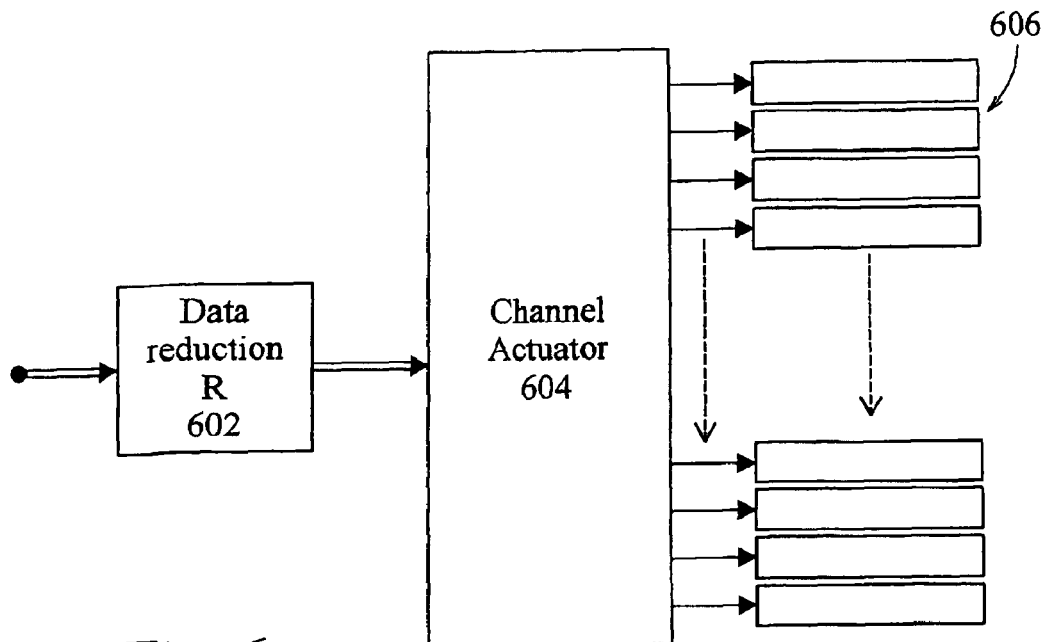
FIG. 6 is a schematic representation of a known ink jet printer.

FIG. 6 is a schematic representation of a known ink jet printer. Input data D is converted in a data reduction unit 602 to values L using the tensor R described above. The values L serve as inputs to a channel actuator 604 which provides actuation signals to respective ink jet channels 606. These can of course take a wide variety of forms.

Figure 7:
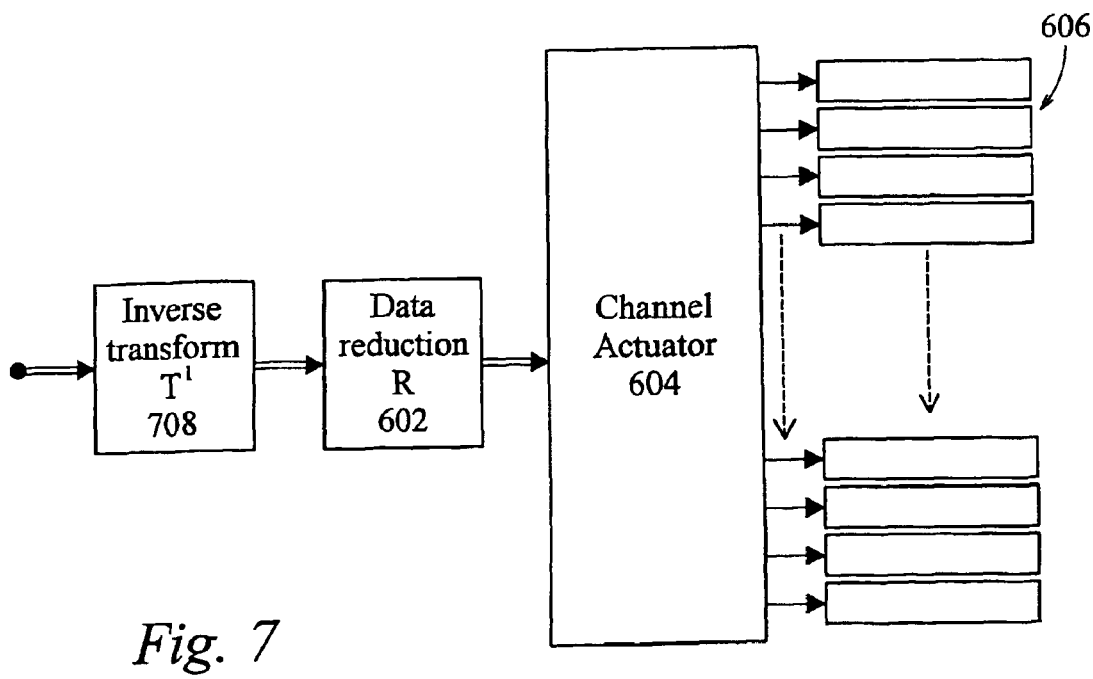
FIG. 7 is a respresentation similar to that of FIG. 6, illustrating an ink jet printer according to the present invention.

FIG. 7 then shows the introduction, according to this invention, of an inverse transform unit 708 which performs the described inverse transform $T^{-1}$ on the input data. The unit 708 may for example comrise a microprocessor or one or a series of look-up tables. The parameters of the inverse transformation $T^{-1}$ are determined in a test mode as described and written into the unit 708 before completion of the assembly procedure. In certain applications, facilities may be made available for modification of the parameters of $T^{-1}$ in a service or maintenance operation.

Whilst an example has been given of the inverse transformation operating on D as $U^{-1}DB^{-1}V^{-1}$, numerous alternatives will exist. The individual components may be utilised above or in different communications or in combination with or replaced by other components relating to errors in a specific ink jet printer architecture.

What is claimed is:

1. Droplet deposition apparatus in which selected numbers of nominally uniform droplets are deposited nominally at regularly arrayed pixels on a medium in response to input data D, comprising at least one value d for each pixel, wherein the inverse of a transformation T which is representative of the effect measured for that specific apparatus of departures from nominal behaviour is applied to the received input data.

2. Apparatus according to claim 2, wherein the transformation T represents all departures from nominal deposition behaviour in terms of errors of deposition coverage area and/or coverage position at precisely regularly arrayed pixels.

3. Apparatus according to claim 1, in which input data D in the form of a set of numbers $d_{ij}$ in the range zero to n representing the desired amount of a colour at pixel i,j is converted to a set of numbers $I_{ij}$ in the range zero to m, where m is less than n and represents the maximum number of droplets of the colour that can be deposited at a pixel, wherein the inverse of the transformation T is applied to the numbers $d_{ij}$ prior to said conversion.

4. A method of manufacturing droplet deposition apparatus in which selected numbers of nominally uniform droplets are deposited nominally at regularly arrayed pixels on a medium in response to input data D comprising at least one value d for each pixel, the apparatus comprising an input terminal for receiving the data D, droplet deposition channels adapted to deposit selected numbers of droplets in response to channel actuation signals and a controller adapted to generate appropriate channel actuation signals in response to said data D; the method including the steps of actuating all channels in response to test data; measuring departures from nominal droplet deposition behavior; characterising said departures in the form of a transformation T and adapting the controller to apply to the date D the inverse of the transformation T.

5. A method according to claim 4, wherein the transformation T characterises departures from nominal deposition behaviour in terms of errors of deposition coverage area at precisely regularly arrayed pixels.

6. A method according to claim 4, comprising converting input data D in the form of a set of numbers $d_{ij}$ in the range zero to n representing the desired amount of a colour at pixel i,j by said controller to a set of numbers $I_{ij}$ in the range zero to m where m is less than n and represents the maximum number of droplets of the colour that can be deposited at a pixel, wherein the controller is adapted to apply the inverse of the transformation T to the numbers $d_{ij}$ prior to said conversion.

7. A method according to claim 6, comprising correcting drop misplacement in pixel i,j by applying to the input data D adjustments to the size of the drop in pixel i,j and adjustment to the size of the drop in at least one adjacent pixel.

8. A method according to claim 7, comprising correcting misplacement of the drop in pixel i,j by an angle $\alpha$ in a misplacement direction by applying to the input data D the adjustments of:

dividing the size of the drop requested in pixel i,j by $(1-\alpha H/p)$ where H is the throw distance and p is the pixel pitch in the direction of misplacement; and reducing the size of the drops requested in the pixel adjacent to the pixel i,j in the misplacement direction by an amount equal to the nominal size in pixel i,j multiplied by $(\alpha H/p)/\{1-(\alpha H/p)\}$.

9. A method according to claim 7, comprising correcting a drop velocity error by applying to the data D a correction for an effective positional misdirection $\theta_{eff}$, where $\theta_{eff}$= actual positional misdirection plus $(fp/v)(1-1/s)$ where:

f is the pixel frequency p is the pixel pitch v is the average drop velocity from jets having no velocity error s is a factor by which drop velocity from the jet having a velocity error differs from v.

10. A method according to claim 7, comprising correcting a drop size error by requesting a drop of nominal size divided by b, where b is the factor by which the drop size is in error.

* * * * *

UNITED STATES PATENT AND TRADEMARK OFFICE
CERTIFICATE OF CORRECTION

PATENT NO. : 6,945,624 B2
DATED : September 20, 2005
INVENTOR(S) : Stephen Temple et al.

It is certified that error appears in the above-identified patent and that said Letters Patent is hereby corrected as shown below:

Column 6,
Line 66, after "Apparatus according to" delete "claim 2," and insert -- claim 1, --.

Column 7,
Lines 7 and 34, after "set of numbers" delete "$I_{ij}$" and insert -- $1_{ij}$ -- in its place.
Line 25, after "to apply to the" delete "date D" and insert -- data D --.

Signed and Sealed this

Fourth Day of April, 2006

JON W. DUDAS
*Director of the United States Patent and Trademark Office*